United States Patent [19]
Azumatani et al.

[11] Patent Number: 5,475,668
[45] Date of Patent: Dec. 12, 1995

[54] METHOD OF PRODUCING FILE MANAGEMENT STRUCTURES, INFORMATION REPRODUCTION APPARATUS AND INFORMATION REPRODUCING METHOD

[75] Inventors: Yasushi Azumatani; Isao Satoh; Yoshihisa Fukushima; Yuji Takagi, all of Osaka; Hiroshi Hamasaka, Hyogo, all of Japan

[73] Assignee: Matsushita Electric Industrial Co., Ltd., Osaka, Japan

[21] Appl. No.: 233,717

[22] Filed: Apr. 26, 1994

Related U.S. Application Data

[63] Continuation of Ser. No. 779,092, Oct. 18, 1991, abandoned.

[30] Foreign Application Priority Data

Oct. 22, 1990 [JP] Japan ................................. 2-285013

[51] Int. Cl.$^6$ ........................................................ G11B 7/00
[52] U.S. Cl. ........................... 369/58; 369/32; 369/47; 360/48; 364/964; 395/600
[58] Field of Search ................................. 369/32, 48, 49, 369/47, 54, 124, 43; 360/27, 32, 48; 395/325, 600, 725, 425; 364/964

[56] References Cited

U.S. PATENT DOCUMENTS 4,791,623  12/1988  Deiotte ........................................ 360/48
4,800,550  1/1989  Yamauchi ................................... 360/48

Primary Examiner—Georgia Y. Epps
Assistant Examiner—Muhammad N. Edun
Attorney, Agent, or Firm—Willian Brinks Hofer Gilson & Lione

[57] ABSTRACT

In an information recording medium, wherein data are reproduced in a sector unit, a file area for recording the file systems of a plurality of operating systems and a discrimination area for recording the position data on the file systems in the file area are provided. Then, the same data recorded in the recording medium can be managed by the operating systems of different file management systems. In a recording apparatus for reproducing data from the information recording medium, the position data are reproduced from the discrimination area and the data recorded in the information recording medium can be read by converting the position data to an actual sector address in the information recording medium. Thus, a file can by reproduced from the recording medium with either of the operating systems.

10 Claims, 13 Drawing Sheets

FIG. 6(a)
| TOP SECTOR ADDRESS OF DATA AREA | P0 |
|---|---|
| NAME OF OPERATING SYSTEM | UNIX |
| TOP SECTOR ADDRESS OF FILE MANAGEMENT INFORMATION | P1 |
| NUMBER OF SECTORS OF FILE MANAGEMENT INFORMATION | S1 |
| NAME OF OPERATING SYSTEM | MS - DOS |
| TOP SECTOR ADDRESS OF FILE MANAGEMENT INFORMATION | P2 |
| NUMBER OF SECTORS OF FILE MANAGEMENT INFORMATION | S2 |
FIG. 6(b)
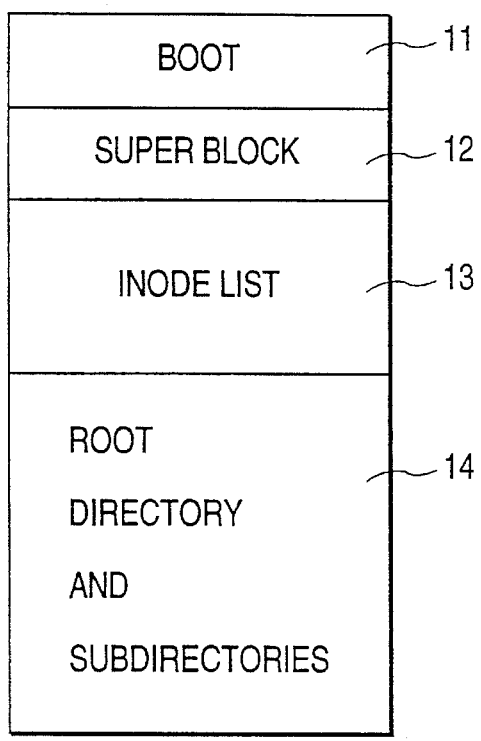
FIG. 6(c)
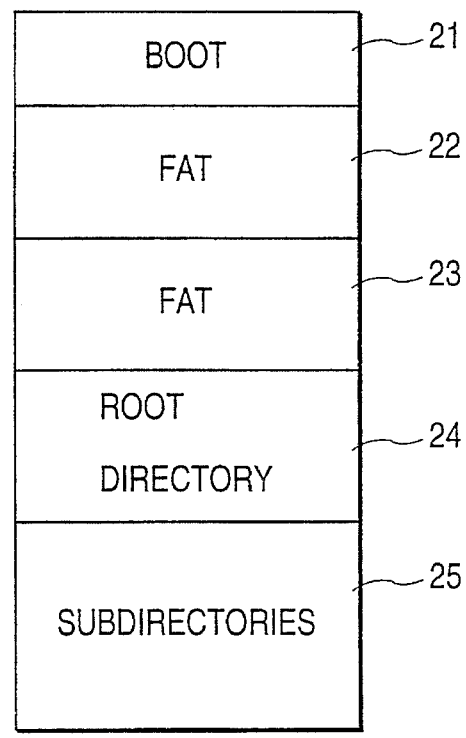

FIG. 12(a)

| OPERATION CODE (E4h) |
|---|
| NAME OF OPERATING SYSTEM OF HOST COMPUTER |

FIG. 12(b)

| OPERATION CODE (E5h) |
|---|
| NAME OF OPERATING SYSTEM OF HOST COMPUTER |

FIG. 13(a)

| | |
|---|---|
| TOP SECTOR ADDRESS OF DATA AREA | P0 |
| TOP SECTOR ADDRESS OF FILE MANAGEMENT DATA | P1 |
| NUMBER OF SECTORS OF FILE MANAGEMMENT DATA | S1 |

FIG. 13(b)

| | |
|---|---|
| TOP SECTOR ADDRESS OF DATA AREA | P0 |
| TOP SECTOR ADDRESS OF FILE MANAGEMENT DATA | P2 |
| NUMBER OF SECTORS OF FILE MANAGEMENT DATA | S2 |

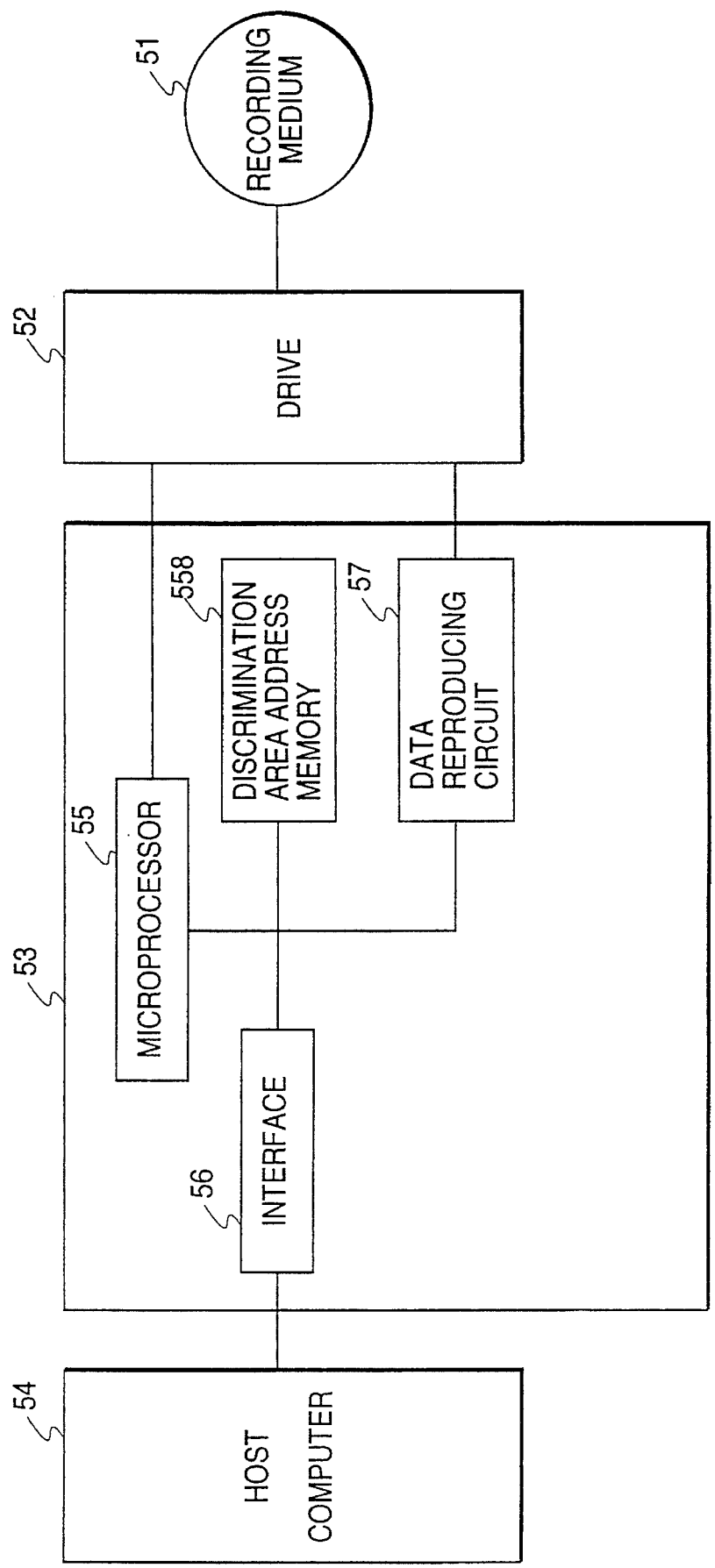

METHOD OF PRODUCING FILE MANAGEMENT STRUCTURES, INFORMATION REPRODUCTION APPARATUS AND INFORMATION REPRODUCING METHOD

This is a continuation of application Ser. No. 07/779,092 filed Oct. 18, 1991 now abandoned.

BACKGROUND OF THE INVENTION

1. Field of the Invention

The present invention relates to a method of producing file management structures different from each other in an information recording medium, and an apparatus and method for reproducing information from the information recording medium.

2. Description of Prior Art

Digital data are recorded in a form of a file in a recording medium in an external memory device such as a magnetic disk device or an optical disk device.

The data recorded in a recording medium are read by an apparatus such as a computer, and such an apparatus uses an operating system having its own file management system.

As mentioned above, each operating system has a different file management system for managing files efficiently. Therefore, if a file for data is allocated in an information recording medium with use of an operating system, the data cannot be read from the information recording medium with use of a different operating system.

For example, FIG. 1 shows a diagram of areas in an information recording medium in the file space system of UNIX which is a well known operating system for work stations. In FIG. 1, numeral 101 designates a boot area for recording a boot program for starting a system, numeral 102 designates a super block area for recording management information on the entire file system such as the size of the area of the file system and the size and the position of free areas not used for recording, numeral 103 designates an area for recording an inode list which is a collection of the information on files and directories such as the positions and the sizes thereof, and numeral 104 designates a data area for recording the data of the files and directories. In this file space system, file management information on the root directory and subdirectories is also recorded in the data area 104.

FIG. 2 displays a diagram for explaining an operation to reproduce a data file F1 registered in the root directory. First, the inode 130 of the root directory is read from the inode list area 103. The inode is managed with inumbers, and an inode of inumber "2" corresponds with the inode 130 of the root directory. In the inode 130, the size and the block address of the root directory are described. In UNIX, areas are managed by dividing them into blocks each consisting of a plurality of successive sectors. The root directory data 140 which are recorded in blocks represented by the block addresses is read in the data area 104 according to the block address. In the root directory data 140, file names and inumbers of the inode of files are described, and an inode 131 having the inumber of the file F1 is read. Then, the size of file F1 and the blocks wherein the data of the file F1 are recorded are obtained, and the data 141 of the file F1 is read in the data area 104 according to the inode 131 of file F1. When the data of a file is recorded in a plurality of blocks, the inode manages all blocks.

FIG. 3 shows a file space system in a recording medium 200 of MS-DOS which is a well known operating system for personal computers. In FIG. 3, numeral 201 designates a boot area for recording a boot program for starting a system, numeral 202 designates an area for a file allocation table (FAT) for recording the use status of a recording medium such as the sizes and the positions of files and subdirectories, the position of free areas not used and the position of defective areas, numeral 203 designates an area for another FAT usually recorded in order to enhance reliability, numeral 204 designates a root directory area for recording a root directory, and numeral 205 designates a data area for recording the data of data files and subdirectories. In this data structure, file management information on subdirectories is recorded in the data area 205.

FIG. 4 displays a diagram for explaining an operation to reproduce a data file F2 registered in the root directory. First, the root directory data 240 are reproduced from the root directory area 204. The root directory describes names, top cluster numbers and sizes of files. In MS-DOS, areas are managed by being divided into clusters consisting of a plurality of successive sectors. The data 250 of the file F2 is reproduced from the cluster designated by the top cluster number in the data area 205. If the data of a file is recorded in a plurality of clusters, the cluster addresses of the second and following clusters are obtained by reproducing the FAT in the area 202.

Thus, the data structures of file management information of UNIX and of MS-DOS are different from each other. In UNIX, the data of files are managed by inodes and directories, while in MS-DOS, they are managed by directories and FAT. The contents of a directory are also different in the two operating systems. That is, in UNIX, file names and inumbers are recorded in a directory, while in MS-DOS, file names, file sizes and top cluster numbers are recorded in a directory.

As explained above, UNIX and MS-DOS have different file management systems. Therefore, even the same data of a file which are recorded with one of the operating systems cannot be reproduced with the other.

SUMMARY OF THE INVENTION

An object of the present invention is to provide a disc-like recording medium wherein files can be recorded so that they can be read by a plurality of operating systems.

Another object of the present invention is to provide a reproducing apparatus which can reproduce a file recorded in such a recording medium.

According to the present invention, a disc-like information recording medium is provided, wherein data are reproduced in a sector unit, comprising a file area for recording file systems of a plurality of operating systems and a discrimination area for recording the position data of each file system. Preferably, the recording medium is read only, and the file area comprises a plurality of management areas, each for recording file management information on a file system of one of the plurality of operating systems, and a data area for recording the data of the file system. Then, file management information of an operating system and data area can be read by reproducing the position data in the discrimination area.

A first information reproducing apparatus for reproducing information in a sector unit from the information recording medium is connected to a host computer which sends a data acquisition instruction or command and a data reproduction instruction or command. When a data acquisition instruction is received from the host computer, a position acquisition means reproduces and saves the position information from the discrimination area. When the data reproduction instruction is received from the host computer, a sector address conversion means converts a sector address contained in the data reproduction instruction, and a data reproduction means reproduces data from the sector designated by the converted sector address and sends the data to the host computer.

A second information reproducing apparatus for reproducing information in a sector unit from the information recording medium is connected to a host computer which sends a position transfer command and a data reproduction command. When a position transfer command including the name of the operating system is received from the host computer position information is transferred to the host computer, and the position transfer means reproduces the position information of a file system of an operating system from the discrimination area. Then the host computer converts the sector address included in the position information. When the data reproduction command is received from the host computer, data reproduction means reproduces data of a file system from a sector designated by the converted sector address included in the data reproduction command, and transfers the data to the host computer.

An advantage of the present invention is to provide an information recording medium, preferably read only, for reproducing data by a plurality of operating systems.

Another advantage of the present invention is to provide an information recording medium which can record the same data so that the data can be read by a plurality of operating systems.

A further advantage of the present invention is to provide a reproducing apparatus which can reproduce data from such an information recording medium.

BRIEF DESCRIPTION OF THE DRAWINGS

These and other objects and features of the present invention will become clear from the following description taken in conjunction with the preferred embodiments thereof with reference to the accompanying drawings, and in which:

FIGS. 6(a), (b) and (c) are diagrams of a data structure of a discrimination area, a data structure of the file management information 4 of UNIX and a data structure of the file management information 5 of MS-DOS;

FIGS. 12(a) and (b) are diagrams of structures of data acquisition command and data transfer command, respectively;

FIGS. 13(a) and (b) are diagrams of position information to be saved in a memory or transferred to a host computer;

FIG. 14 is a block diagram of an information reproducing apparatus of another embodiment of the present invention.

DETAILED DESCRIPTION OF THE PREFERRED EMBODIMENTS

Figure 1:
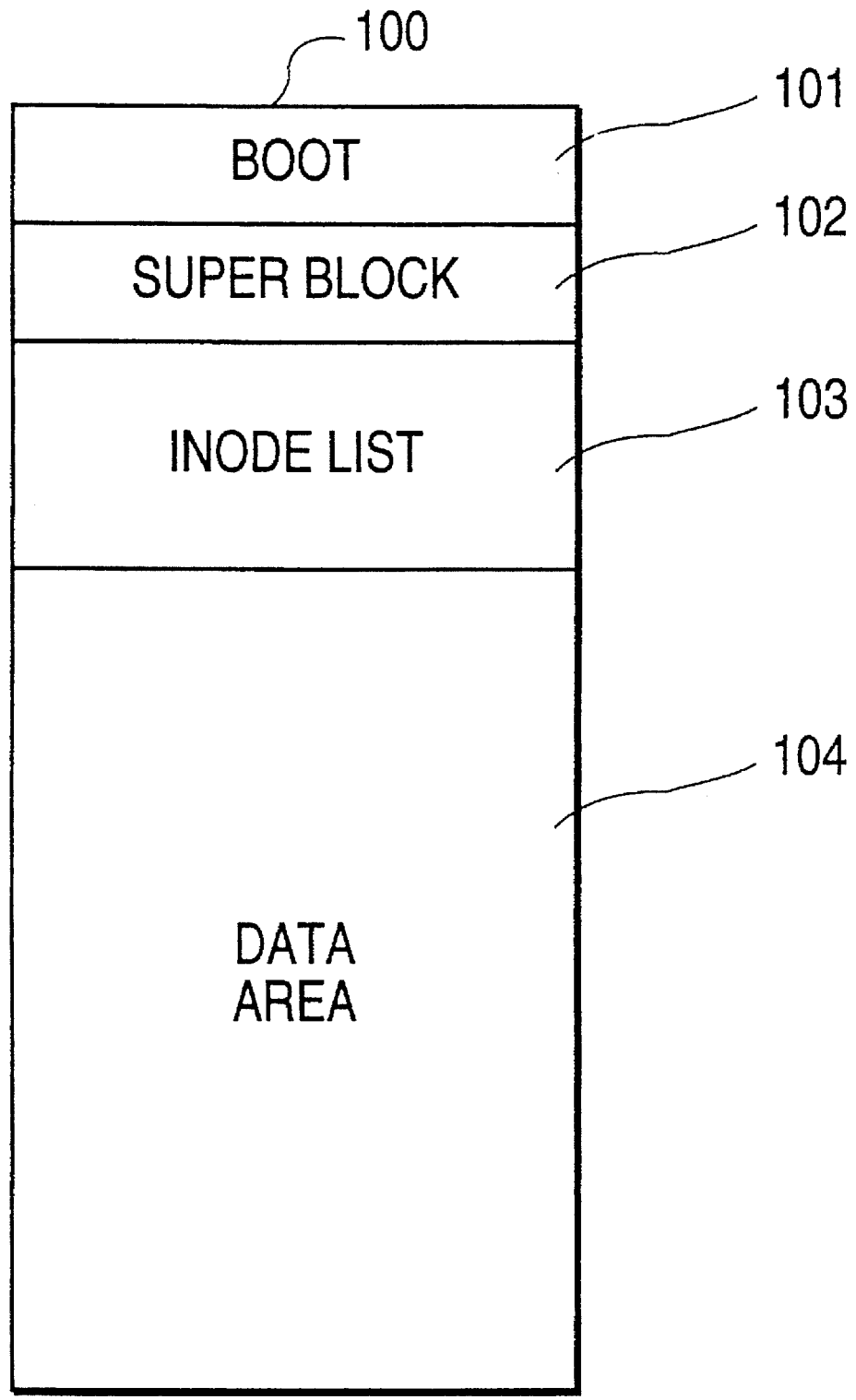
FIG. 1 is a diagram of a file system in an information recording medium of UNIX.
Figure 2:
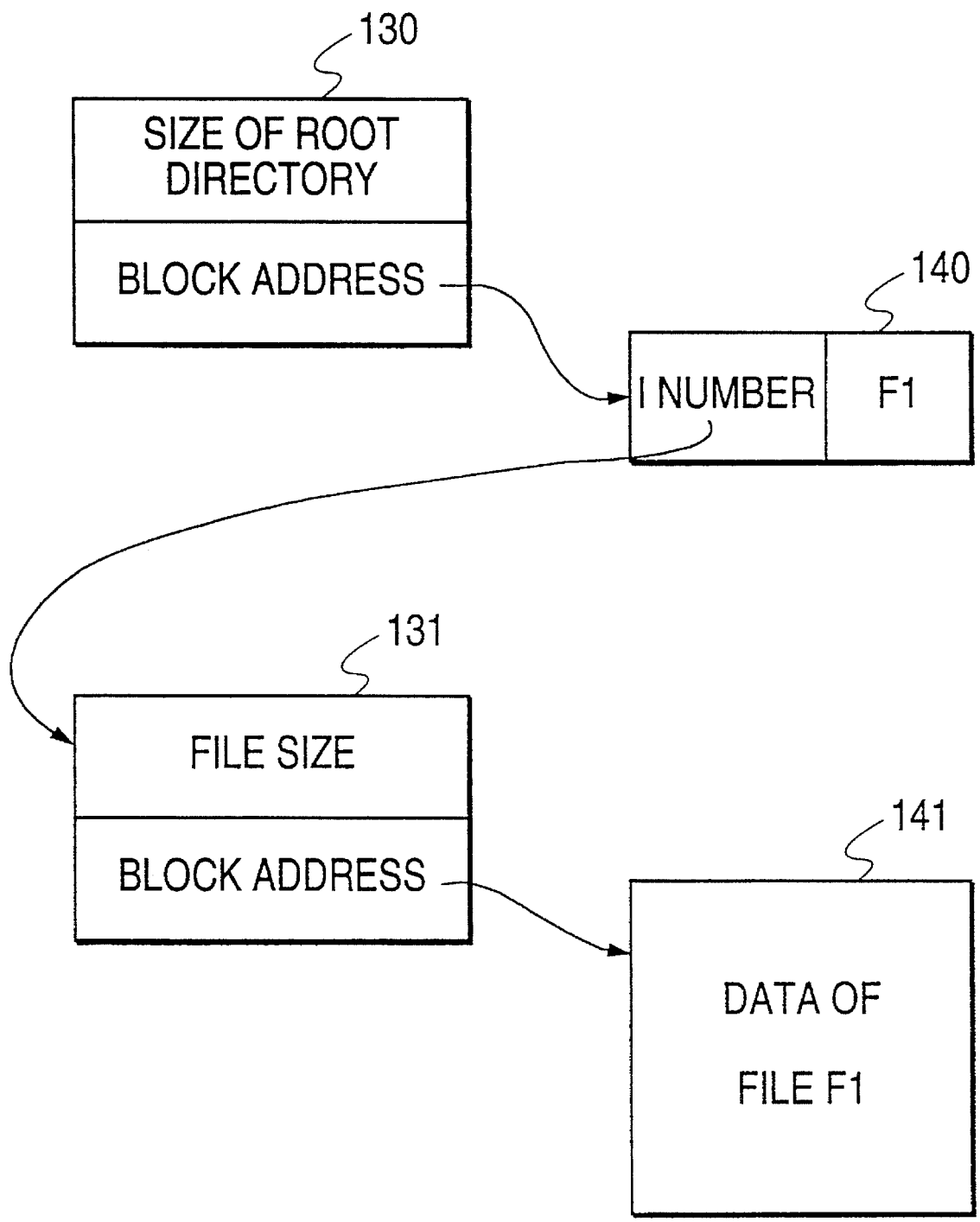
FIG. 2 is a diagram for explaining an operation in UNIX to read file F1 recorded in the root directory.
Figure 3:
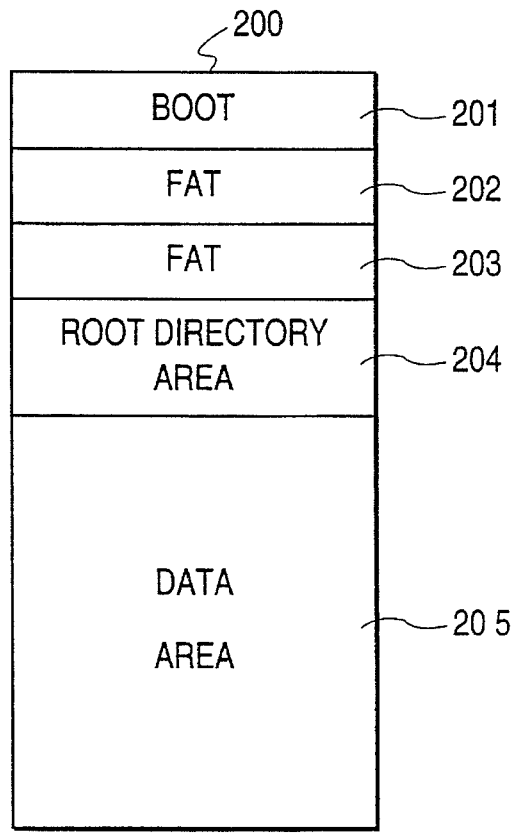
FIG. 3 is a diagram of a file system in an information recording medium of MS-DOS.

Embodiments of the present invention will be explained below with reference to the accompanying drawings throughout which like parts are designated by like reference numerals.

Figure 5:
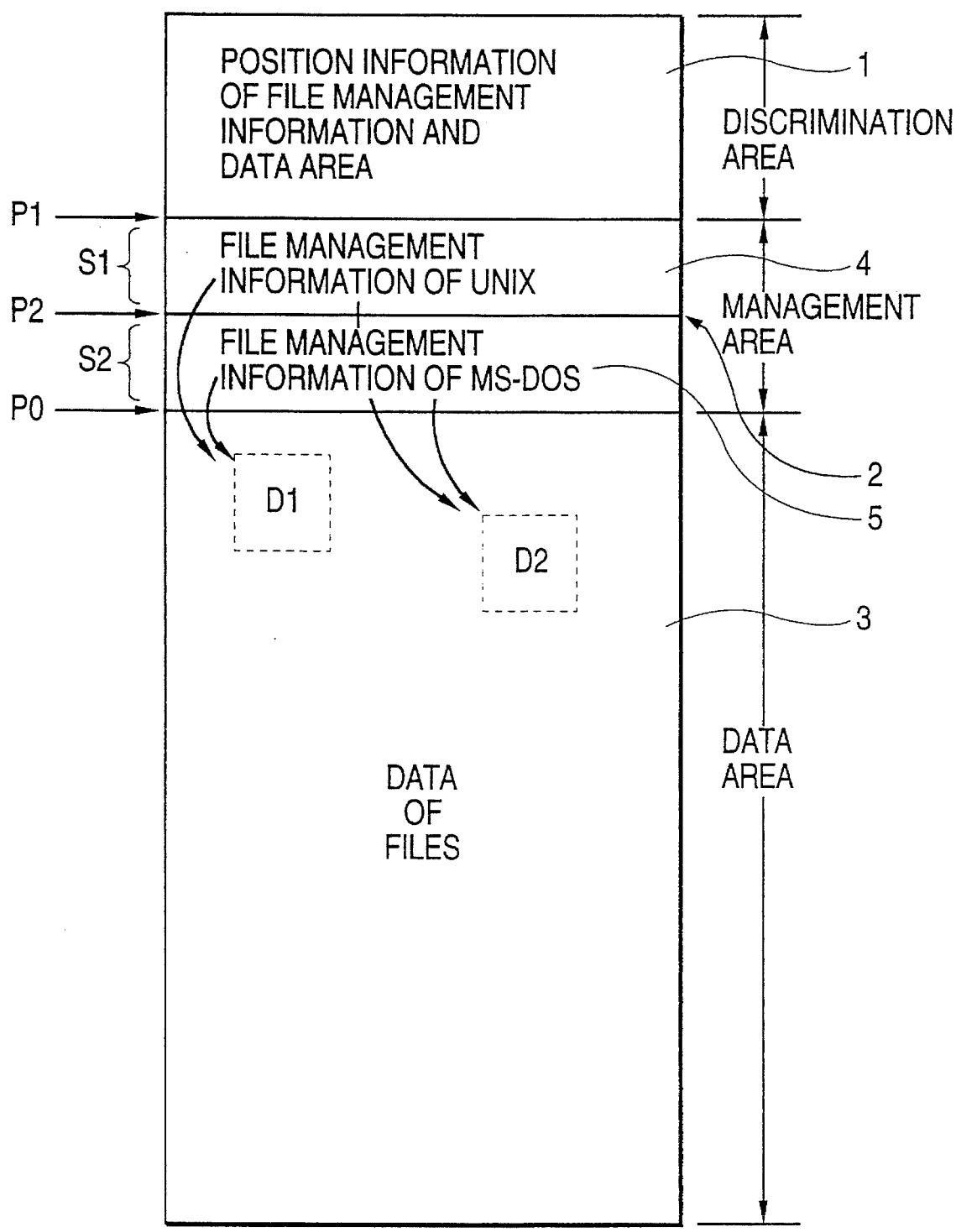
FIG. 5 is a diagram of the structure of areas in an embodiment of a read only information recording medium according to the present invention.

FIG. 5 shows a diagram of the structure of areas in an optical disk such as a CD-ROM of an embodiment according to the present invention, wherein data are reproduced in a sector unit and the same file can be managed by a plurality of operating systems, in this Figure, UNIX and MS-DOS. In FIG. 5, numeral 2 designates a management area for storing file management information of a plurality of operating systems, numeral 3 designates a data area for storing data to be recorded in files, and numeral 1 designates a discrimination area for storing position information of the file management information of the two operating systems and of the data area 3.

The file management information includes all information on the files, except the actual data to be recorded in the data area 3, such as names and positions of the directories, names, positions and sizes of the files and the date of recording. File management information of UNIX and file management information of MS-DOS are recorded in file management information areas 4 and 5 in the management area 2, respectively. The former area 4 consists of sectors of a number S1 and starts from an address P1, while the latter area 5 consists of sectors of a number S2 and starts from an address P2. The data area 3 starts from an address P0.

In the data area 3, the same data for a data file is not recorded twice though the two operating systems are used, and each data file can be managed by the two operating systems according to the file management information. FIG. 5 shows a situation wherein actual data D1 and D2, for example, are managed both by the file management information of UNIX in the area 4 and by the file management information of MS-DOS in the area 5. For example, the data D1 can be reproduced both with UNIX and with MS-DOS. Hereinafter, during discussion of all drawings, reference to the discrimination area 1, management area 2, data area 3, and file management areas 4 and 5 refers to FIG. 5.

FIGS. 6(a)–(c) show the data structure of areas defined in the optical disk. FIG. 6(a) displays the data structure of the discrimination area 1 for recording the address (P0) of the top sector of the data area 3, the names of the operating system (UNIX, MS-DOS), the addresses (P1, P2) of the top sector and the numbers (S1, S2) of the sectors of the file management information of each of the operating systems. If the data area 3 and the management area 2 consists not of a group of continuous sectors, but of separate groups of sectors, the addresses of the top sectors and the numbers of sectors in each group are recorded.

FIG. 6(b) displays the data structure of the file management information area 4 of UNIX, which includes 4 includes a boot area 11 for recording a boot program used to start the UNIX system, a super block area 12 for recording file management information on the entire file system such as the size of the area of the file system and the size and the position of the free area not used for recording, an inode list area 13 including a collection of the information on each file and directory such as the position and the size of the files and the directories, and an area 14 for a root directory and subdirectories having directory names and file names.

The information on the sector addresses in the super block area 12 and the inode list area 13 is calculated and recorded by assuming that the data area 3 follows from the last sector in the area 14 for the root directory and subdirectories. Therefore, the file management information area of UNIX can be recorded in the area 4 only where the entire area is continuous, and the structure of the areas in the optical disk is not needed to be recognized.

FIG. 6(c) displays the internal structure of the file management information area 5 of MS-DOS, which includes a boot area 21 for recording a boot program used to start the MS-DOS system, two areas 22, 23 for the same file allocation table (FAT) for recording the use status of the position of the files and the subdirectories, and the position of free areas not used, a root directory area 24 for recording the names and the positions of the subdirectories belonging to the root directory and the names, the positions and the sizes of the files belonging to the root directory, and a subdirectory area 25 for recording the names and the positions of subdirectories and the names, the positions and the sizes of the files in the subdirectories. The information on the sector addresses in the FAT areas 22, 23, the root directory area 24 and the subdirectory area 25 are calculated and recorded by assuming that the data area 3 follows from the last sector of the subdirectory area 25. Therefore, the file management information of MS-DOS can be recorded in the file management information area 5 only for a case where the entire area is continuous, and the structure of the areas in an optical disk is not needed to be recognized.

An optical disk is a read only information recording medium, and the above-mentioned data structure with reference to FIGS. 5 and 6(a)–(c) can be recorded at the prescribed areas in a read only information recording medium such as an optical disk.

Figure 7:
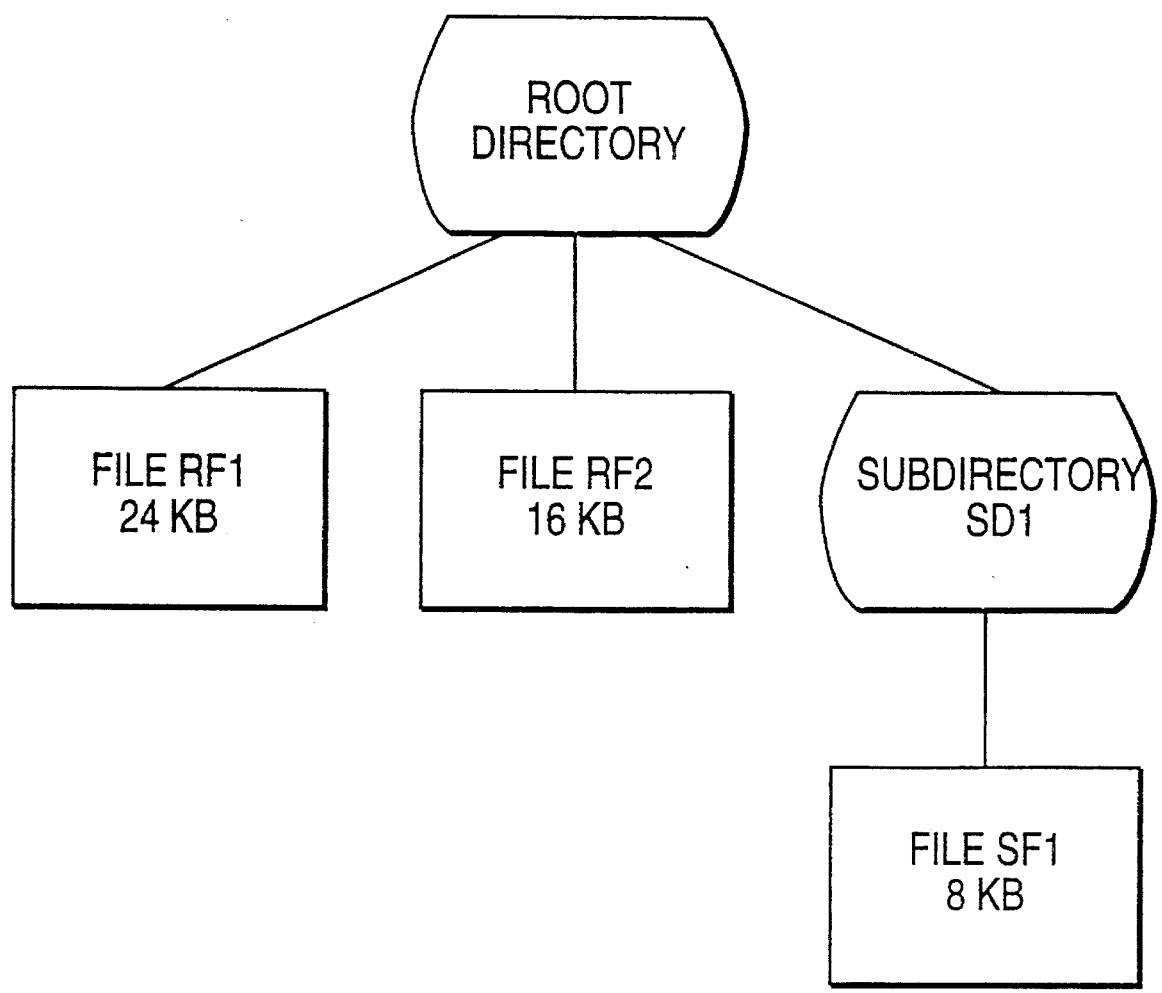
FIG. 7 is an example of a file system recorded in an information recording medium.

Next, an example explains the reproduction of the files shown in FIG. 7 that have been recorded in an optical disk having the internal data structure as shown in FIGS. 5 and 6(a)–(c). In the file system shown in FIG. 7, a data file RF1 of 24 kilobytes (KB), a data file RF2 of 16 KB, and a subdirectory SD1 are recorded in the root directory and a data file SF1 of 8 KB is recorded in the subdirectory SD1. The sector size of the optical disk is set to be 512 bytes.

Figure 8:
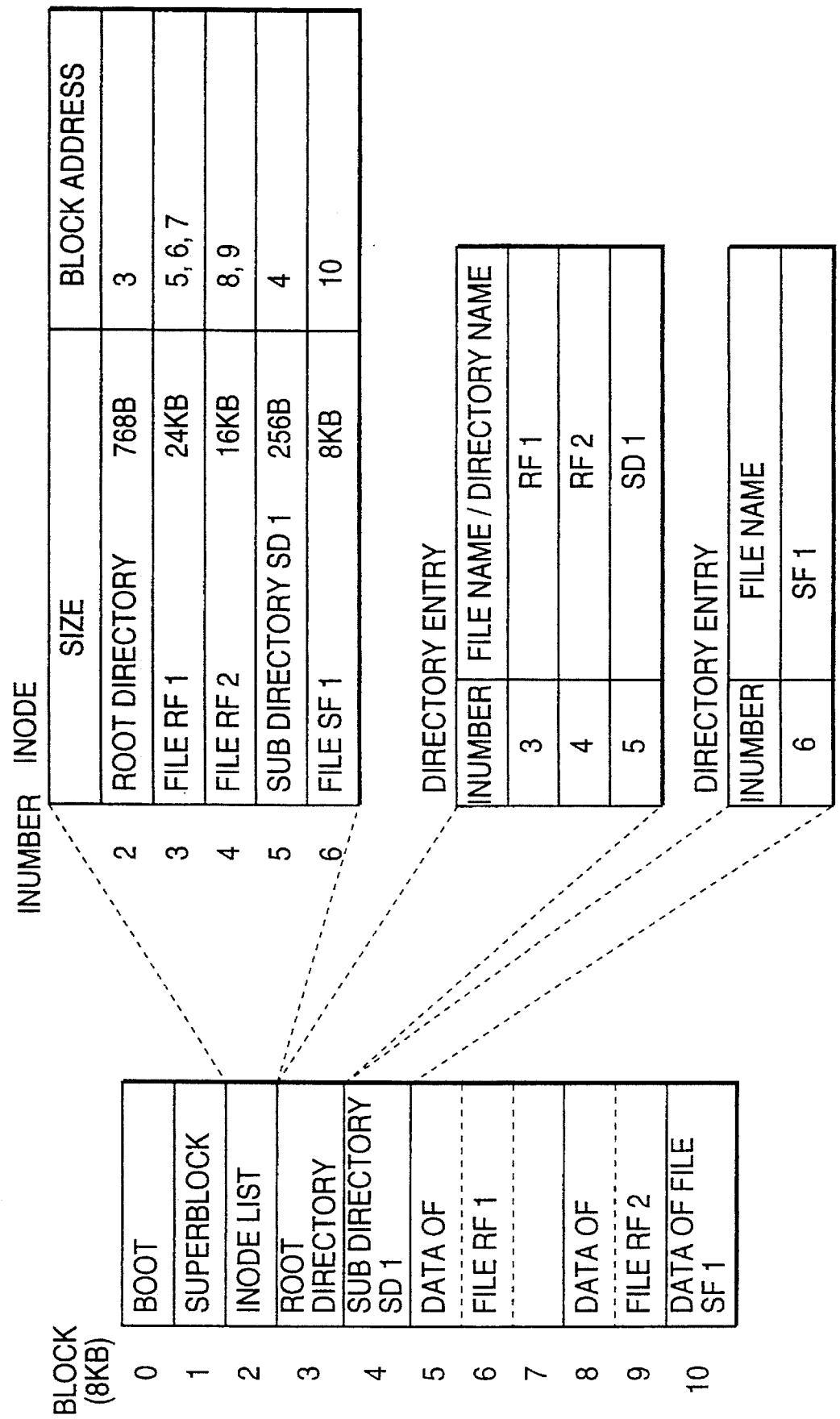
FIG. 8 is a diagram of blocks when the files shown in FIG. 7 are recorded in the UNIX file system.

FIG. 8 illustrates a map of blocks when the files shown in FIG. 7 are recorded in the UNIX file system. Only matters necessary to explain this invention are displayed in FIG. 8. In this embodiment, a block is composed of 16 continuous sectors and each block is composed of 8 kilobytes. Further, the directory entry of UNIX is set to be 256 bytes.

As shown in FIG. 8, a boot program, a super block, an inode list, a root directory, a subdirectory and the data of files RF1, RF2, and SF1 are recorded in succession from block "0" to block "10". That is, the boot program is recorded in block "0", the super block is recorded in block "1", and the inode list is recorded in block "2". The root directory is recorded in block "3" next to the inode list, and the block address of the inode for the root directory or the inode of inumber "2" is set to be "3". The subdirectory SD1 is recorded in block "4" following the root directory, and the block address of the inode for the subdirectory SD1 or the inode of inumber "5" is set to be "4". Next, the data of file RF1 of 24 KB, the data of file RF2 of 16 KB and the data of file SF1 of 8 KB are recorded successively in the data area 3. That is, the data of file RF1 uses three blocks, and the addresses "5", "6" and "7" of the three blocks are set in the block address of the inode (inumber "3") for file RF1. The data of file RF2 uses two blocks, and the addresses "8" and "9" of the two blocks are set in the block address of the inode (inumber "4") for file RF2. The data of file SF1 uses one block, and the address "10" of the block is set in the block address of the inode (inumber "6") for file SF1.

The data of 40 KB of the blocks "0"–"4" from the boot program to the subdirectory SD1 are recorded in an optical disk in this order in the file management information area 4 of UNIX as shown in FIGS. 5 and 6, wherein the blocks "3"–"4" belong to the directory-and-subdirectory area 14. The data of the three files of total 48 KB are recorded in blocks "5" to "10" in this order in the data area 3 shown in FIG. 5.

Figure 9:
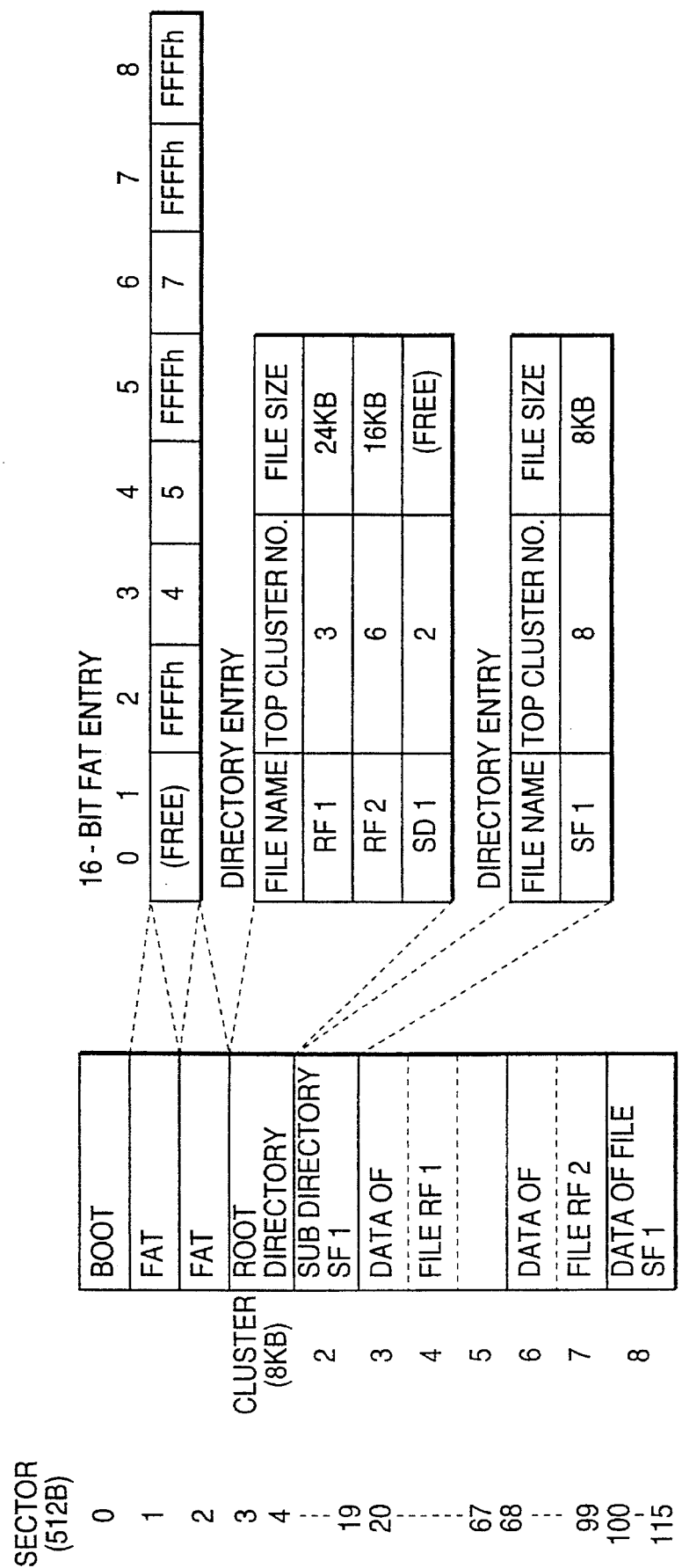
FIG. 9 is a diagram of sectors when the files shown in FIG. 7 are recorded in the MS-DOS file system.

FIG. 9 shows a map of sectors when the files shown in FIG. 7 are recorded in the MS-DOS file system, wherein only matters necessary to explain this invention are displayed. In this embodiment, a cluster is composed of 16 sectors and each cluster is composed of 8 continuous kilobytes. Further, the size of a cluster is set to be the same as the size of a block which is a unit used to manage areas in the UNIX system. The directory entry of MS-DOS is set to be 32 bytes.

As shown in FIG. 9, a boot program, two FATs, a root directory, a subdirectory and the data of a file are recorded in succession from sector "0". That is, the boot is recorded in sector 0, and the FATs are recorded in sectors "1" and "2". The root directory is recorded in sector "3" next to the sector for the second FAT.

The subdirectory SD1 is recorded in sector "4" following that of the root directory. In MS-DOS, area is managed in cluster units in sectors following that of the root directory, and the cluster number begins from two. The top cluster number is set to be "2", and "FFFFh" (hereinafter "h" means hexadecimal notation) is set in a 16-bit FAT entry "2" in correspondence to cluster "2" for subdirectory SD1 in order to show that the cluster "2" is the last cluster for the subdirectory SD1.

Then, the data of the file RF1 of 24 KB, the data of file RF2 of 16 KB and the data of file SF1 of 8 KB are recorded from cluster "3" successively. First, the data of file RF1 uses three clusters. The top cluster number of the directory entry of file RF1 is set to be "3", and a number "4" is set in a 16-bit FAT entry "3" in correspondence with cluster "3" in order to show that cluster "4" is used successively for RF1. Further, "5" is set in a 16-bit FAT entry "4" in correspondence with cluster "4" in order to show that cluster "5" is used successively for file RF1, and "FFFFh" is set in a 16-bit FAT entry "5" in correspondence to cluster "5" in order to show that the cluster "5" is the last cluster for file RF1. Next, the data of file RF2 uses two clusters. The too cluster number of the directory entry of file RF2 is set to be "6", and a number "7"

is set in a 16-bit FAT entry "6" in correspondence with cluster "6" in order to show that cluster "7" is used successively for file RF2. Further, "FFFFh" is set in a 16-bit FAT entry "7" in correspondence to cluster "7" in order to show that the cluster "7" is the last cluster for file RF2. Finally, the data of file SF1 uses one cluster. The top cluster number of the directory entry of file SF1 is set to be "8", and "FFFFh" is set in a 16-bit FAT entry "8" in correspondence to cluster "8" in order to show that the cluster "8" is the last cluster for file SF1.

Then, the data of 10 KB recorded in the sectors "0"–"19" from the boot to the subdirectory SD1 are recorded in the optical disk in this order in the file management information area 5 of MS-DOS shown in FIG. 5, whereas the data of the three files RF1, RF2 and SF1 with a total of 48 KB recorded in sectors "20" to "115" need not be recorded again because they are the same as the data of the blocks "5" to "10" shown in FIG. 8 recorded in the data area 3 shown in FIG. 5.

As explained above, the positions of the discrimination area 1, file management information areas 4, 5 of UNIX and MS-DOS and the data area 3 in a read only optical disk are fixed for a file system to be recorded in the optical disk, and the data recorded in the file management areas 4, 5 correspond with the data files recorded in the data area 3. Data recorded in the optical disk is reproduced in a sector unit. A sector address described in the file management information of the operating systems is determined for each operating system for managing the data files without knowing the areas in the file space system in the optical disk. In each operating system, file management information on the files recorded in the data area is prepared by describing a sector address in the data area, the sector address being allocated continuously from a sector next to the file management information areas. However, the sector address can be converted to an actual sector address allocated uniquely in the optical disk. For example, in the optical disk shown in FIG. 5, the file management information area 4 for UNIX is not continuous with, but is separated from the data area 3. However, on reproducing data recorded in the data area 3, an actual sector address in the optical disk is uniquely determined from a sector address in correspondence with a block address designated for the UNIX file system. The conversion of the sector address will be explained later in detail.

Further, in the file management information areas 4 and 5, the position data of the data files recorded in the data area 3 are recorded so that the same data files can be managed, by both operating systems, as mentioned above with reference to FIGS. 7–9. Then, the same actual sector address can be obtained by converting a sector address obtained in the file management information recorded in the file management information areas 4 and 5. As mentioned above, the size of a cluster in MS-DOS is made equal to that of a block in UNIX in this embodiment. Thus, the same data can be reproduced by the two operating systems, and it is not needed to record the same data twice in the data area 3.

It is clearly explained above clearly that the UNIX file management information recorded in the area 4 and the MS-DOS file management information recorded in the area 5 can be used to manage the data of the same files.

An optical disk is used as a recording medium in the above-mentioned embodiment. However, other read only information recording medium such as a magnetic disk may also be used instead of an optical disk.

Next, information reproducing apparatuses for reproducing files from an optical disk having the data structure shown in FIGS. 4 and 5(a)–(c) will be explained.

Figure 10:
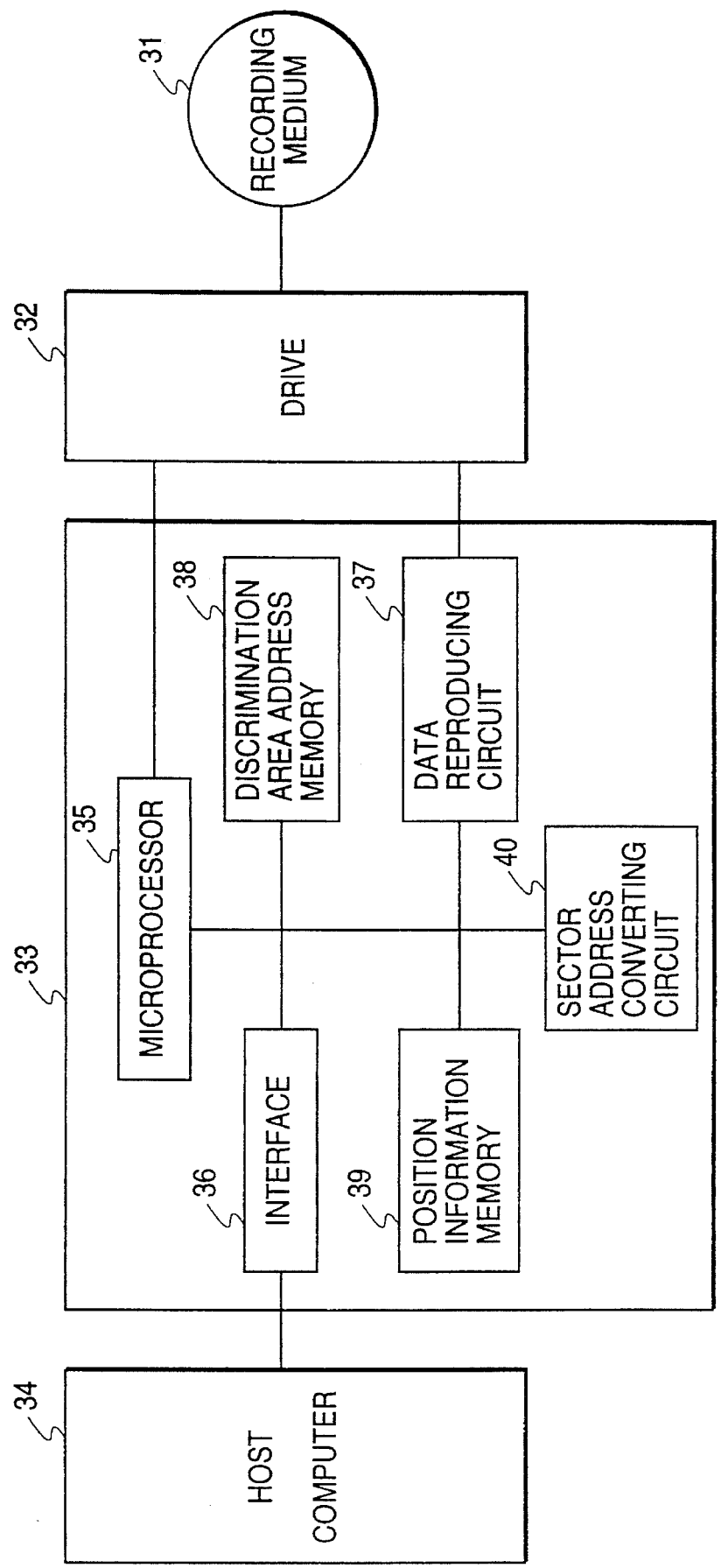
FIG. 10 is a block diagram of an information reproducing apparatus of an embodiment of the present invention.

FIG. 10 shows a block diagram of an information reproducing apparatus of one embodiment. Numeral 31 designates a recording medium, for example an optical disk, wherein data are recorded as shown in FIGS. 5 and 6(a)–(c), numeral 32 designates a drive for reproducing data from the optical disk 31, numeral 33 designates a controller for controlling read operation of the drive 32, and numeral 34 designates a host computer which sends commands to the controller 33 and receives data reproduced from the optical disk 31 via the drive 32. In the controller 33, numeral 35 designates a microprocessor for controlling the controller 33, numeral 36 designates an interface connected between the host computer 34 and the controller 33 to transfer the commands and the data to be read, numeral 37 designates a data reproducing circuit for demodulating the reproduced data sent from the drive 32 and performing error correction to generate reproduced data, numeral 38 designates a discrimination area address memory for recording the sector address of the discrimination area 1 of the optical disk 31, numeral 39 designates a position information memory for storing file management information and position information on the data area 3, and numeral 40 designates a sector address converting circuit for converting a sector address included in the data reproduction command received from the host computer 34, according to the position information in the position information memory 39.

Figure 11:
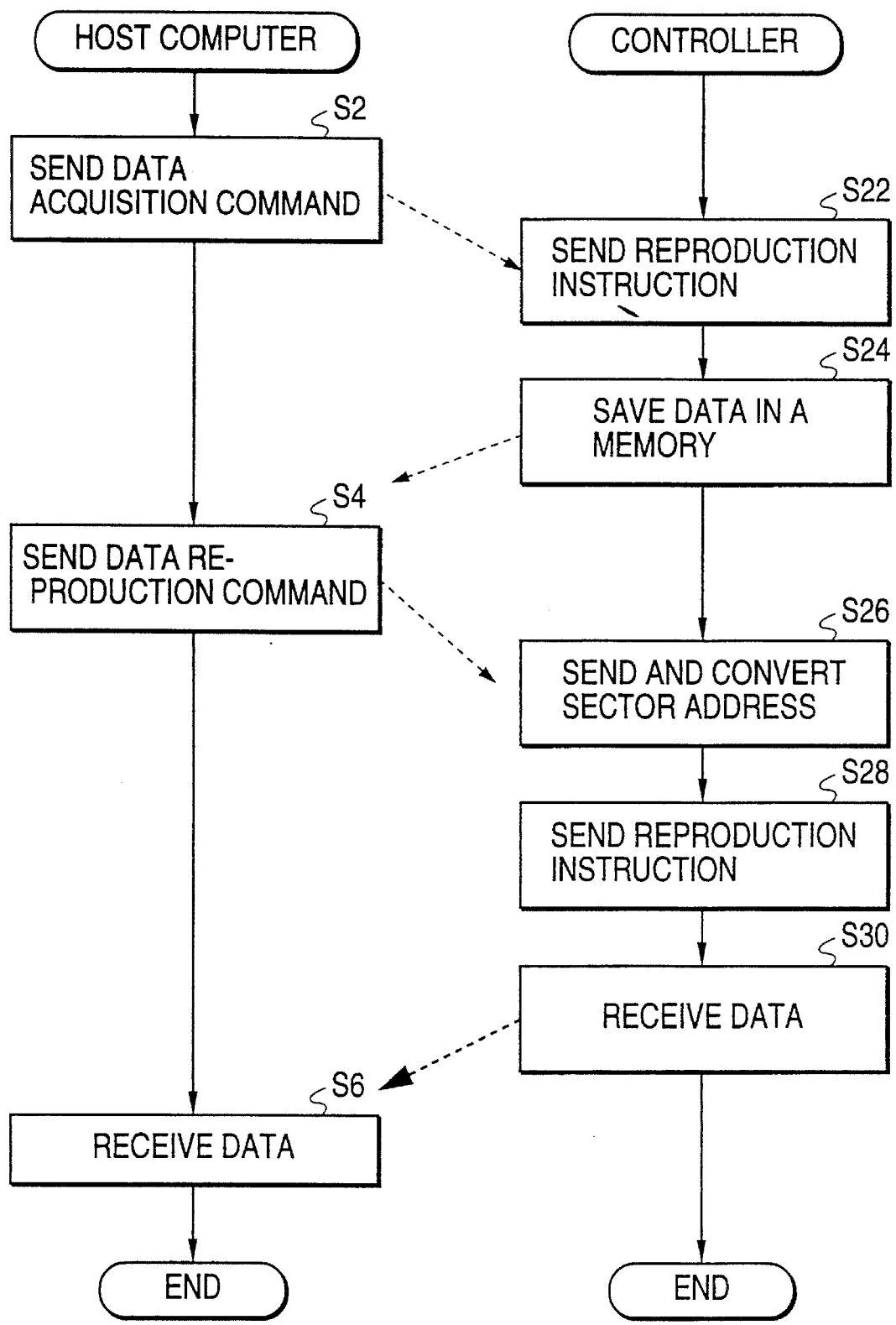
FIG. 11 is a main flowchart of a host computer and a microprocessor controlling the reproducing controller shown in FIG. 10.

The operation of reproducing a file from an optical disk 31 by the above-mentioned controller 33 will be explained with reference to a flowchart shown in FIG. 11 which displays a flow of the host computer 34 and the microprocessor 35 controlling the controller 33.

The host computer 34 sends a position acquisition command having the name of the operating system of the host computer 34 via the interface 36 to the microprocessor 35 (step S2). FIG. 12(a) shows the structure of data acquisition command. A data acquisition command consists of an operation code "E4h" and the name of the operating system of the host computer 34 (FIG. 10).

When the microprocessor 35 receives a data acquisition command from the host computer 34, it reads the sector address recorded in the discrimination area address memory 38 and sends an instruction to the drive 32 to reproduce the data from the obtained sector address (step S22).

Then, the data reproducing circuit 37 demodulates the data reproduced by the drive 32, performs error correction of the obtained data and sends the position information on the file management information and on the data area 3 to the microprocessor 35.

Then, the microprocessor 35 takes out the top sector address P0 of the data area 3 of the position information and the top sector address and sector number in the file management information in correspondence with the operating system included in the position acquisition command, and stores them in the position information memory 39 (step S24). That is, if the name of the operating system in the position acquisition command is UNIX, as shown in FIG. 13(a), the top sector address P0 in the data area 3 and the top sector address P1 and the sector number S1 in the UNIX file management information area 4 are stored in the position information memory 39. On the other hand, if the name of the operating system in the position acquisition command is MS-DOS, the top sector address P0 in the data area 3 and the top sector address P2 and the sector number S2 in the MS-DOS file management information area 5 are stored in the position information memory 39, as shown in FIG. 13(b).

Next, the host computer 34 sends a data reproduction command via the interface 36 to the microprocessor 35 (step S4). The data reproduction command includes the sector address of the file system in the operating system.

When the microprocessor 35 receives a data reproduction command from the host computer 34 via the interface 36, it sends the sector address included in the data reproduction command to the sector address converting circuit 40 (step S26).

The sector address converting circuit 40 converts the sector address according to equations (1)–(6) mentioned below on the basis of the position information in the information memory 39.

In the equations (1)–(6), X designates the sector address included in the data reproduction command, X' designates the sector address after conversion, $P_n$ designates the top sector address of the file management information area, $S_m$ designates the number of sectors of the file management information area and $P_n$ designates the top sector address of the data area 3.

If the sector address X is smaller than the sector number $S_m$ of the file management information, $$X'=X+P_n. \tag{1}$$

If the sector address X is equal to or larger than the sector number $S_m$ of the UNIX file management information area, $$X'=X-S_m+P_n. \tag{2}$$

That is, when the operating system in the position acquisition command is UNIX, if the sector address X is smaller than the sector number $S_1$ of the UNIX file management information area, $$X'=X+P_1. \tag{3}$$

If the sector address X is equal to or larger than the sector number $S_1$ of the file management information area, $$X'=X-S_1+P_0. \tag{4}$$

On the other hand, when the operating system in the position acquisition command is MS-DOS, if the sector address X is smaller than the sector number $S_2$ of the MS-DOS file management information area, $$X'=X+P_2. \tag{5}$$

If the sector address X is equal to or larger than the sector number $S_1$ of the MS-DOS file management information area, $$X'=X-S_2+P_0. \tag{6}$$

When the microprocessor 35 receives the converted sector address from the sector address converting circuit 40, it sends a reproduction instruction to the drive 32 in order to reproduce data in the optical disk 31 from the converted sector address (step S28).

The data reproducing circuit 37 demodulates the signal reproduced by the drive 32, performs data correction and sends the generated data to the microprocessor 35.

When the microprocessor 35 receives the reproduced data, it transfers them via the interface 36 to the host computer 34 (step S30).

Then, the host computer 34 receives the data from the microprocessor 35 via the interface 36 (step S6).

As explained above, in the first embodiment of the information reproducing apparatus, the host computer 34 communicates only the name of the operating system used to the controller 33, without knowing the area structure in the optical disk 31. Then, the host computer 34 can read file management information and the data in the data files by reproducing at sectors according to the file management system of the operating system.

If the data area 3 and the management area 2 are not set in a continuous set of sectors, but are divided into a collection of sectors, the sector address converting circuit 40 converts the sector address by using the top sector addresses and the number of sectors of each sector set in the position information generated by reproducing the discrimination area 1.

Figure 4:
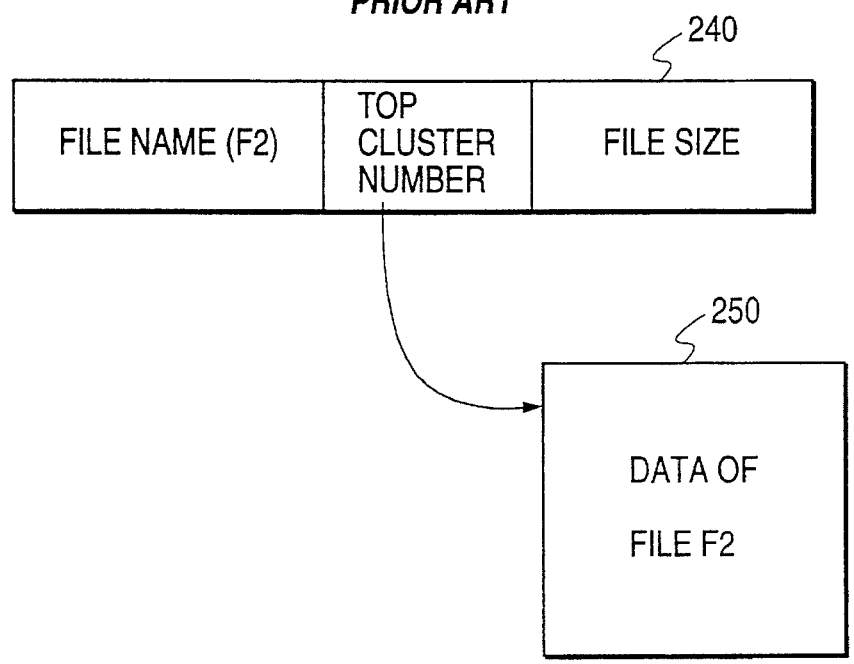
FIG. 4 is a diagram for explaining an operation in MS-DOS to reproduce a file F2 recorded in the root directory.

Turning to FIG. 4, another embodiment of an information apparatus will be explained. In this embodiment, the conversion of the sector address is carried out by a host computer 54 according to the position information transferred from a controller 53. FIG. 14 shows a block diagram of the information reproducing apparatus. Numeral 51 designates an optical disk shown in FIGS. 8 and 9(a)–(c) wherein data are recorded, numeral 52 designates a drive for reproducing data from the optical disk 51, numeral 53 designates the controller for controlling the reproduction operation of the drive 52, numeral 54 designates the host computer which sends commands to the controller 53 and receives data reproduced from the optical disk 51 via the drive 52. This structure is similar to that of the first embodiment shown in FIG. 10. In the controller 53, numeral 55 designates a microprocessor for controlling the controller 53, numeral 56 designates an interface connected between the host computer 54 and the controller 53 to transfer the commands and the data to be read, numeral 57 designates a data reproducing circuit for demodulating the reproduced data sent from the drive 52 and performing error correction to generate reproduction data, and numeral 58 designates a discrimination area address memory for recording the sector address of the discrimination area 1 of the optical disk 51.

Figure 15:
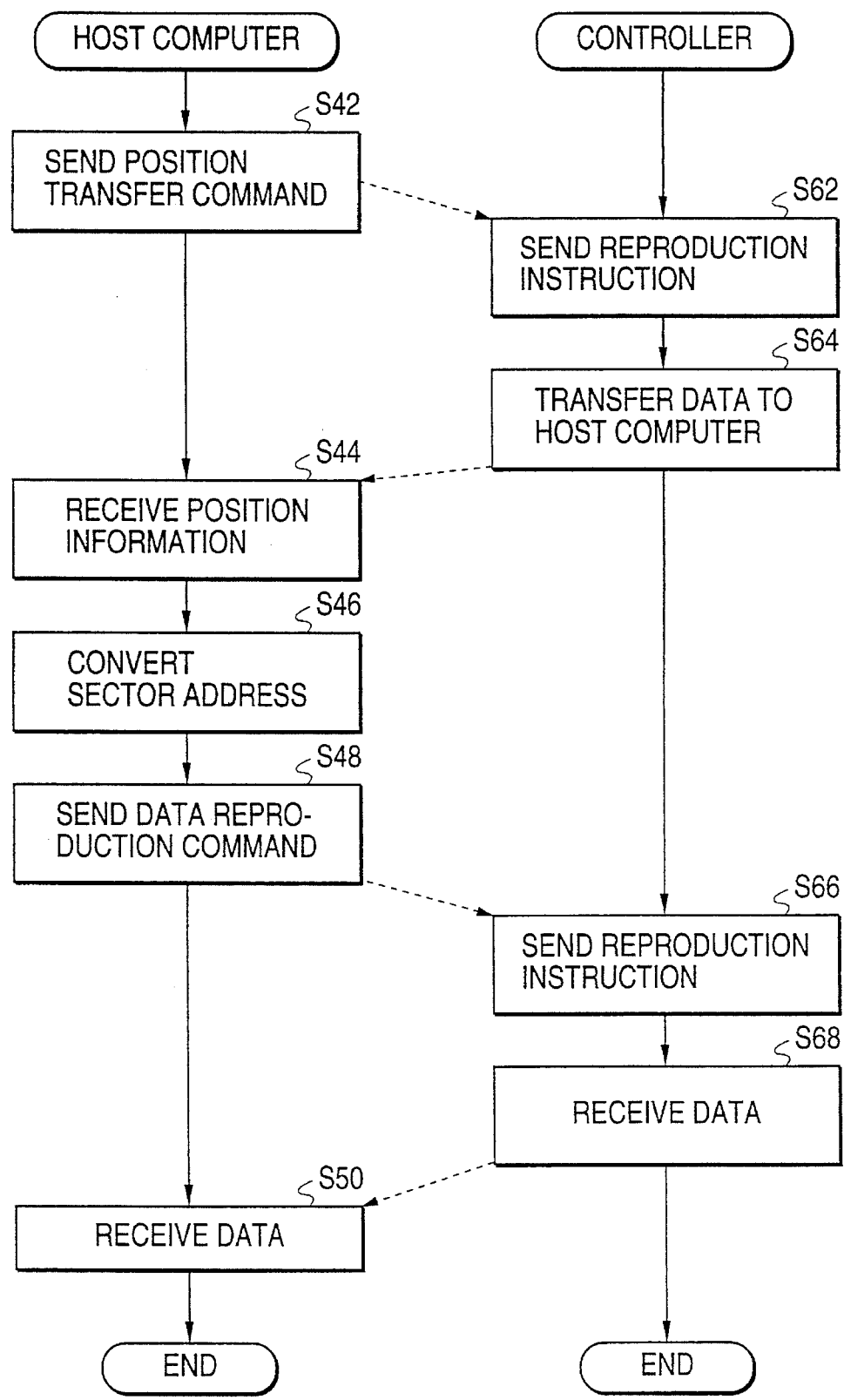
FIG. 15 is a main flowchart of a host computer and a microprocessor controlling the reproducing controller shown in FIG. 14.

The operation of reproducing a file from an optical disk 51 by the above-mentioned controller 53 will be explained with reference to a flowchart shown in FIG. 15 which displays a flow of the host computer 54 and the microprocessor 55 controlling the controller 53.

The host computer 54 sends a position transfer command having the name of the operating system of the host computer 54 via the interface 56 to the microprocessor 55 (step S42). FIG. 12(b) shows the structure of the data transfer command. A data transfer command consists of an operation code "E5h" and the name of the operating system of the host computer 54.

When the microprocessor 55 receives a data transfer command from the host computer 54, it reads the sector address in the discrimination area 1 recorded in the discrimination area address memory 58 and sends an instruction to reproduce the data from the obtained sector address to the drive 52 (step S62).

Then, the data reproducing circuit 57 demodulates the data reproduced by the drive 52, performs error correction of the obtained data and sends the position information on the file management information and the data area 3 to the microprocessor 55.

Then, the microprocessor 55 takes out the top sector address P0 of the data area 3 in the position information and the top sector address and sector number in the file management information that corresponds to the operating system included in the position transfer command, and it transfers them to the host computer 54 (step S64). That is, if the name of the operating system in the position transfer command is UNIX, as shown in FIG. 13(a), the top sector address P0 in the data area 3 and the top sector address P1 and the sector number S1 in the UNIX file management information area 4 are transferred to the host computer 54. On the other hand, if the name of the operating system in the position transfer command is MS-DOS, the top sector address P0 in the data area 3 and the top sector address P2 and the sector number S2 in the MS-DOS file management information area 5 are transferred to the host computer 54, as shown in FIG. 13(b).

The host computer 54 receives the data via the interface 56 from the microprocessor 55 (step S44), and it converts the sector address according to equations (11)–(16) mentioned below on the basis of the position information (step S46).

In the equations (11)–(16), Y designates the sector address included in the data reproduction command, Y' designates the sector address after conversion, $P_n$ designates the top sector address of the file management information area, $S_m$ designates the number of sectors of the file management information area and $P_n$ designates the top sector address of the data area 3.

If the sector address Y is smaller than the sector number $S_m$ of the file management information, $$Y'=Y+P_n. \qquad (11)$$

If the sector address Y is equal to or larger than the sector number $S_m$ of the UNIX file management information area, $$Y'=Y-S_m+P_n. \qquad (12)$$

That is, when the operating system in the position acquisition command is UNIX, if the sector address Y is smaller than the sector number $S_1$ of the UNIX file management information area, $$Y'=Y+P_1. \qquad (13)$$

If the sector address Y is equal to or larger than the sector number $S_1$ of the file management information area, $$Y'=Y-S_1+P_0. \qquad (14)$$

On the other hand, when the operating system in the position acquisition command is MS-DOS, if the sector address Y is smaller than the sector number $S_2$ of the MS-DOS file management information area, $$Y'=Y+P_2. \qquad (15)$$

If the sector address Y is equal to or larger than the sector number $S_1$ of the MS-DOS file management information area, $$Y'=Y-S_2+P_0. \qquad (16)$$

Returning to FIGS. 14 and 15, the host computer 54 sends a reproduction instruction including the converted sector address Y' via the interface 56 to the microprocessor 55 (step S48).

The microprocessor 55 sends an instruction to the drive 52 in order to reproduce data in the optical disk 51 from the converted sector address Y' (step S66).

The data reproducing circuit 57 demodulates the signal reproduced by the drive 52, performs data correction and sends the data to the microprocessor 55.

The microprocessor 55 receives the reproduced data and transfers them via the interface 56 to the host computer 54 (step S68).

Then, the host computer 54 receives the data from the microprocessor 55 via the interface 56 (step S50).

As explained above, in the second embodiment of the information reproducing apparatus, the host computer 54 communicates only the name of the operating system used to the controller 53. Then, the host computer 54 receives the position of data area 3 in the optical disk and the position and size of the file management information area for the operating system to be used, and it converts the sector address in the file system of the operating system to be used to the sector address on the optical disk by using the received data. Thus, a reproduction command received from the host computer includes the converted address, and the controller can reproduce the file management information on the files and the data of the files with use of the converted address.

If the data area 3 and the management area 2 are not set as a continuous set of sectors, but are divided into a collection of sectors, the host computer 54 converts the sector address by using the top sector addresses and the number of sectors of each sector set in the position information generated by reproducing the discrimination area 1.

In the reproducing apparatuses shown in FIGS. 10 and 14, the host computer 34, 54 sends a command such as a data acquisition command or a data transfer command. Such a command may be provided as an optional command added to an operating system.

However, it is also possible to provide a switch instead of such a command in the controller 33, 53 for designating the operating system used by a host computer 34, 54. Then, the microprocessor 35, 55 which controls the controller 33, 53 detects the switch signal and performs an appropriate operation for reproducing information for the designated operating system. Further, such a function can also be provided by adding a device driver in the host computer.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method for producing a file system in an information recording medium, the file system comprising data files, and file management information for managing positions of data files, unused areas and defective areas, said method comprising the steps of:

assigning in an information recording medium a data area for recording data files, a plurality of file management information areas for recording a plurality of file management information, and a discrimination area for recording position information of the data area and the file management information areas;

recording each of the data files one by one in the data area;

producing a first file management information for managing the data files;

recording the first file management information in a first file management information area of the file management information areas;

producing a second file management information for managing the data files, said second file management information having a data structure for managing positions of the data files, unused areas and defective areas, said data structure being different from the first file management information;

recording the second file management information in a second file management information area of the file management information areas; and recording discrimination data and position data of the first and second file management information areas and position data of the data area in the discrimination area;

whereby a first file system including the first management information and the data files and a second file system including the second management information and the data files can be stored in the information recording medium.

2. The method according to claim 1, wherein each of said plurality of file management information comprises a a directory file having a hierarchy of directories, a position of the directory file.

3. The method according to claim 1, wherein each of said file management information is produced by assuming that said data area is assigned continuously next after the file management information area recording with said file management information in said information recording medium.

4. The method according to claim 1, wherein a logical unit of an area assigned to the data files to be recorded is the same for both first and second file management information, and the files are recorded in said data area by assigning areas through use of the logical unit.

5. A method for reproducing information from an information recording medium, said information recording medium including a data area for recording data files, a plurality of file management information for recording a plurality of file management information having data structures different from each other for managing positions of the data files, unused areas and defective areas, and a discrimination area for recording discrimination data, position data of each of the plurality of file management information areas and a position data of the data area, wherein each of the file management information is produced by assuming that the data area is assigned continuously next after the file management information area recording with the file management information in the information recording medium., said method comprising:

reading a position data of the data area from the discrimination area;

determining position data of a particular file management information area by using the discrimination data recorded in the discrimination area and reading the position data from the discrimination area;

converting a first data reproducing position to a second data reproducing position in the information recording medium by using the position data of the data area and the position data of the particular file management information area after determining the first data reproducing position when said data area is assigned continuously after said file management information area; and reproducing data from the converted, second data reproducing position.

6. An information reproduction apparatus for reproducing information from an information recording medium, said information recording medium including a data area for recording data files, a plurality of file management information areas for recording a plurality of file management information having data structures different from each other for managing positions of the data files, unused areas and defective areas, and a discrimination area for recording discrimination data and position data of each of the plurality of file management information areas and position data of the data area, said information reproduction apparatus being connected to a host computer and comprising:

position acquisition means for reproducing and saving in a memory means the position information from the discrimination area when a position acquisition instruction is received from the host computer, said position information including position data of the data area and position data of a file management information area in correspondence to the discrimination data described in the position acquisition instruction;

reproducing position conversion means for reading the position information from said memory means and for converting a data reproducing position contained in a data reproduction instruction received from the host computer by using the position information; and data reproduction means for reproducing data from said data reproducing position designated by the reproducing position conversion means and for sending the reproduced data to the host computer.

7. The information reproduction apparatus according to claim 6, wherein said reproducing position conversion means converts a data reproducing position included in a data reproducing instruction by assuming that said data area is assigned continuously after said file management information area, position data of said file management information area being stored in said memory means.

8. The information reproduction apparatus according to claim 7, wherein said position acquisition means uses the name of an operation system used by the host computer.

9. An information reproduction apparatus for reproducing information from an information recording medium, said information recording medium including a data area for recording data files, a plurality of file management information areas for recording a plurality of file management information having data structures different from each other for managing positions of the data files., unused areas and defective areas, and a discrimination area for recording discrimination data and position data of each of the plurality of file management information areas and a position data of the data area, said information reproduction apparatus being connected to a host computer and comprising:

position transfer means for reproducing the position information from the discrimination area when a position transfer instruction is received from the host computer, and for transferring the position information to the host computer, said position information including position data of the data area and position data of a file management information area in correspondence to the discrimination data described in the position transfer instruction; and data reproduction means for reproducing data from a data reproducing position designated in a data reproduction instruction received from the host computer, and for sending the reproduced data to the host computer.

10. The information reproduction apparatus according to claim 9, wherein said position transfer means uses the name of an operation system used by the host computer.

* * * * *